Sept. 10, 1957 W. O. BAZHAW 2,805,727
METHOD OF DETERMINING GEOLOGICAL FEATURES
Filed July 5, 1952

INVENTOR.
W. O. Bazhaw
BY
*C. M. McKnight*
ATTORNEY

United States Patent Office 2,805,727
Patented Sept. 10, 1957

2,805,727

METHOD OF DETERMINING GEOLOGICAL FEATURES

Willis O. Bazhaw, Tulsa, Okla.

Application July 5, 1952, Serial No. 297,263

1 Claim. (Cl. 181—.5)

This invention relates to geophysical prospecting.

My co-pending application entitled "Method of Deep Well Surveying," Serial Number 297,264, filed on July 5, 1952, now Patent 2,718,930 discloses a method of geophysical prospecting wherein a vertical spread of seismometers are suspended in a relatively deep bore hole. In addition, a blasting charge is placed in the bore hole below the vertical seismometer spread. Upon detonation of the blasting charge, seismic waves are dispersed in substantially every direction from the bore hole. When the seismic waves contact a formation having a seismic velocity different from the velocity of the surrounding formation, they are reflected in various directions depending upon the disposition of the reflecting surface and the direction of travel of the incident waves. A portion of the reflected waves will travel substantially horizontally back toward the bore hole and will be received by the seismometers comprising the vertical seismometer spread. A portion of the reflected waves will be refracted and will travel substantially vertically toward the surface of the earth in the vicinity of the bore hole. These last mentioned seismic waves are received by seismometers placed on the surface and distributed around the bore hole. Subsequently, a charge is set off in a bore hole a known distance from the first mentioned bore hole and at a depth corresponding to the depth of the first charge. A portion of the seismic waves generated by the second detonation will be received by the vertical seismometer spread whereby the seismic velocity of the formation in which the charges are detonated may be determined.

By this method, several types of geological features which are possible oil bearing traps may be located. The deep traveling seismic waves are utilized to determine the distance of these geological features from the bore hole and the vertical components of the reflected waves are utilized to determine the direction of the reflecting surface from the bore hole. Thus, the exact location of the reflecting surface may be determined. It is apparent, however, that by use of this method, as with conventional methods of seismic surveying, the ultimate information obtained is only the location of geological features which are possible oil bearing traps. Further steps must be taken to definitely determine the presence and location of oil.

The present method contemplates the determination of the actual presence of oil in a certain geological feature. After a geological feature has been definitely located, I contemplate utilizing the principle that electrofiltration potentials occur wherever an electrolyte is forced under pressure through a porous medium. To perform the contemplated steps, a plurality of electrodes are inserted in the earth in spaced relation substantially directly above the located geological feature. A blasting charge is then detonated in the bore hole, which may have been utilized in locating the geological feature by the above described method of my co-pending application, to again direct seismic waves toward the possible oil bearing trap. The displacement of the formation resulting from the seismic waves causes relative motion of oil with respect to porous formations and forces any oil which may be trapped in the geological feature through the adjacent porous formation to create electrofiltration potentials. These potentials are received by the electrodes to indicate the presence of oil.

An important object of this invention is to provide a complete method of locating possible oil bearing formations and determining the presence of oil therein.

Another object of this invention is to provide a novel method of determining the presence or absence of oil in a given geological feature.

A further object of this invention is to provide a novel method of locating oil deposits by use of electrical potentials.

Another object of this invention is to eliminate the drilling of dry holes in the search for oil deposits.

A still further object of this invention is to provide a practical method of locating oil deposits which may be economically practiced.

Other objects and advantages of the invention will be evident from the following detailed description, read in conjunction with the accompanying drawings, which illustrate my invention.

Figure 1:
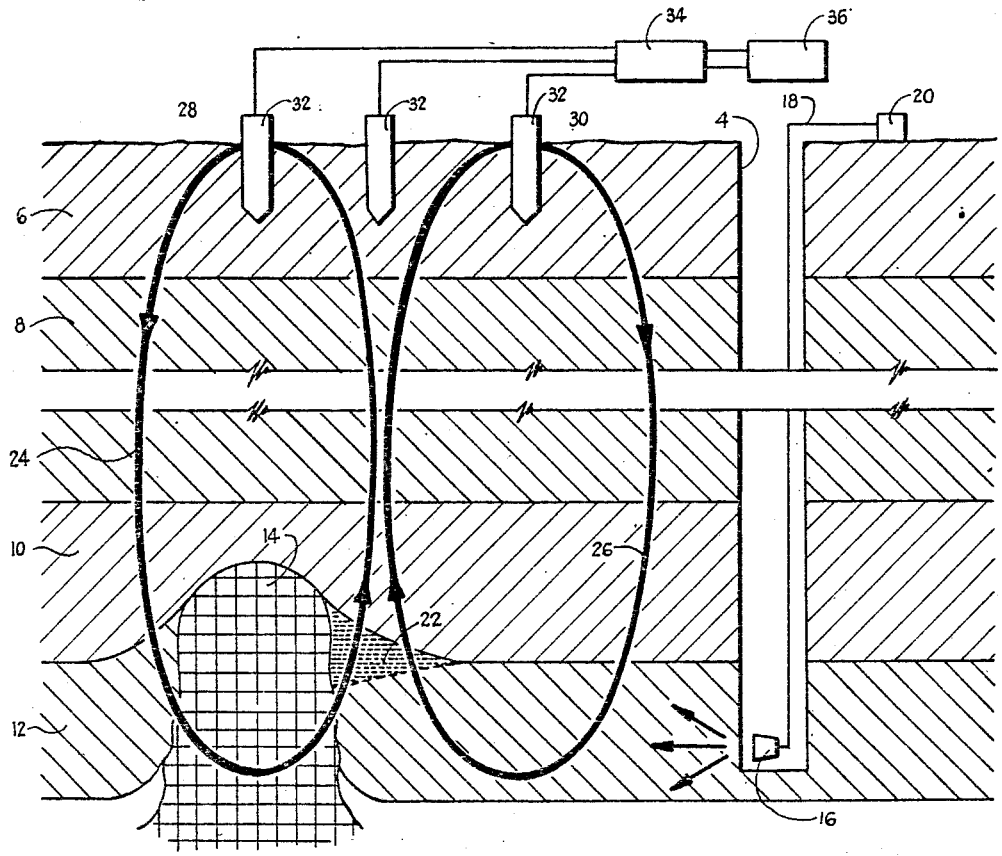
Figure 1 is a diagrammatic sectional view illustrating the disposition of apparatus for practicing the present invention.

Referring to the drawings in detail, reference character 4 designates a bore hole extending downwardly through various formations 6, 8, 10 and 12. The bore hole 4 is preferably two thousand feet or deeper and may be an abandoned oil well if the same is available. In the event the possible oil bearing structure 14 (which may be of any type, such as a buried reef or the like) has been located in the manner described in the above mentioned co-pending application, the bore hole 4 may be one of the bore holes used in locating the structure 14.

A blasting charge 16 is placed in the bore hole 4, preferably within the formation 12, that being the formation in which the structure 14 is located. The charge 16 is connected by the usual lead 18 to a detonator 20 on the surface to facilitate detonation of the charge 16. Upon detonation of the blasting charge 16, seismic waves are disbursed in substantially every direction from the bore hole 4, including a direction toward the geological feature or structure 14. Assuming that a reservoir 22 is located adjacent the structure 14 when the compression front of the seismic waves reaches the reservoir, the fluids contained therein will be forced through the adjacent porous formation. In the event the reservoir contains strata of gas, oil and water, the diffusion of the water with the oil and the resulting flow of the oil through the adjacent formation will develop potentials. The direction of current flow resulting from these potentials is indicated by the arrowed lines 24 and 26. It will be noted that the current flow is upwardly to a position adjacent the surface and then downwardly back to the reservoir 22. As a result, a potential difference will be established at the surface of the earth between the points 28 and 30.

Figure 2:
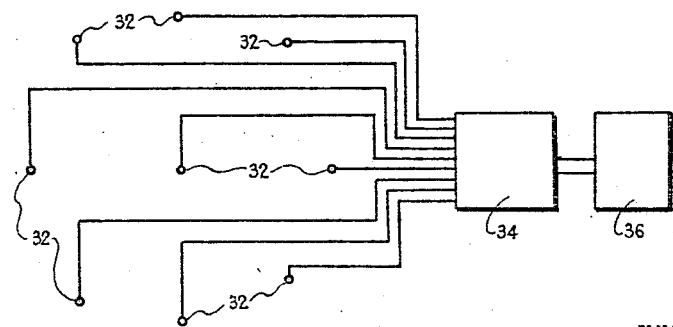
Figure 2 is a diagrammatic plan view illustrating the preferred arrangement of the electrodes used in the present invention.

To receive this potential difference, I provide a plurality of electrodes 32 distributed substantially directly above the known geological feature 14. The electrodes 32 are preferably provided in a circular pattern as shown in Fig. 2 with one of the electrodes disposed in the center of the circular pattern directly above the geological feature 14.

At least two of the electrodes 32 will receive the current flow indicated by the lines 24 and 26 to establish a potential difference therebetween. These potentials are in turn transmitted to a suitable amplifier 34 to produce a current preferably of an amplitude suitable for visual indication. If desired, the energy from the amplifier 34 may in turn be fed to a recording unit 36 of the type commonly used in seismic work for recording the potential difference.

When potentials are established due to the presence of fluids between any two of the electrodes 32, there is a direct indication of the presence of oil adjacent the geological structure 14.

To increase the potential created by forcing the oil through the adjacent formation in the reservoir 22, a charge 16 may be utilized with what is commonly called a "shaped charge." A "shaped charge" is a charge of explosive arranged in substantially a conical shape to control the direction of the blast. It will be apparent that when such a shaped charge is disposed in the bore hole 4 and directed toward the structure 14, the compression front of the seismic waves provided thereby will be materially increased to increase the indication of the presence of the fluid in the reservoir 22. Thus the flow of oil contained in a reservoir 22 through the adjacent formation will be increased.

From the foregoing, it is apparent that the present invention provides a method of determining the presence or absence of an oil deposit in or adjacent to a known geological feature. The method preferably utilizes one of the bore holes used in locating the geological feature. Seismic waves are generated in the lower portion of such a bore hole, and preferably within the formation which contains the known geological feature. When the compression front of the seismic waves reaches the geological feature, any oil contained therein will be subjected to pressure and forced through the adjacent formation. A rarefaction wave follows a compression wave, causing a transient current flow in an opposite direction from that created by the compression wave. Such a flow of oil creates potentials with resulting current flow which can be received at the surface by suitable electrodes. Thus the presence or absence of oil in a known geological feature may be directly determined without the necessity of physically piercing the formation, as is now the practice in the art.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

A method of determining the presence of oil in a known geological feature, comprising the steps of creating a seismic blast several thousand feet below the earth's surface at a point spaced from the geological feature whereby the compression front of the seismic waves will cause relative motion of any oil with respect to the geological feature, detecting any potential created between spaced points adjacent the surface of the earth substantially directly above the geological feature, and controlling the direction of the blast path toward the geological feature in a substantially horizontal direction within the geological horizon of the geological feature.

References Cited in the file of this patent

UNITED STATES PATENTS

| | | |
|---|---|---|
| 2,233,992 | Wyckoff | Mar. 4, 1941 |
| 2,276,306 | Hoover | Mar. 17, 1942 |
| 2,276,335 | Peterson | Mar. 17, 1942 |
| 2,354,659 | Bazhaw et al. | Aug. 1, 1944 |
| 2,503,904 | Dahm | Apr. 11, 1950 |
| 2,557,714 | Williams | June 19, 1951 |
| 2,564,128 | Pugh | Aug. 14, 1951 |
| 2,601,522 | Heiland et al. | June 24, 1952 |